United States Patent [19]
Roth

[11] Patent Number: 6,119,224
[45] Date of Patent: Sep. 12, 2000

[54] FAST SHIFT AMOUNT DECODE FOR VMX SHIFT AND VPERM INSTRUCTIONS

[75] Inventor: Charles Philip Roth, Austin, Tex.

[73] Assignee: International Business Machines Corporation, Armonk, N.Y.

[21] Appl. No.: 09/104,652

[22] Filed: Jun. 25, 1998

[51] Int. Cl.[7] .................................................. G06F 13/00
[52] U.S. Cl. .......................................................... 712/300
[58] Field of Search .............................................. 712/300

[56] References Cited

U.S. PATENT DOCUMENTS

| | | | |
|---|---|---|---|
| 4,999,808 | 3/1991 | Blabut | 712/300 |
| 5,524,245 | 6/1996 | Zarrin et al. | 712/300 |
| 5,592,684 | 1/1997 | Gaskins | 712/300 |
| 5,781,923 | 7/1998 | Hunt | 712/300 |
| 5,819,117 | 10/1998 | Hanson | 712/300 |
| 5,918,075 | 6/1999 | Paysan | 712/300 |

*Primary Examiner*—David Y. Eng
*Attorney, Agent, or Firm*—Anthony V. S. England; Felsman, Bradley, Vaden, Gunter & Dillon, LLP

[57] ABSTRACT

A multimedia facility within a processor employs a crossbar to perform operations requiring byte reordering. Prior to the cycle in which an instruction is executed, the instruction is checked to determine if the instruction is a predetermined type of instruction. If not, the operand which should contain encoded crossbar selects is filled with zeros before presentation to the crossbar select generation logic. If the instruction is one of the predetermined type of instructions, however, the real operand containing the encoded crossbar selects is presented to the crossbar select generation logic. As a result, only crossbar selects which designate byte 0 of the source operand as the source need to be qualified with a signal verifying the instruction being executed. The fanout of the qualification signal is thus reduced to an acceptable level, at which 1 cycle latency and 1 cycle throughput may be achieved.

24 Claims, 4 Drawing Sheets

FAST SHIFT AMOUNT DECODE FOR VMX SHIFT AND VPERM INSTRUCTIONS

RELATED APPLICATIONS

The present invention is related to the subject matter of commonly assigned, copending U.S. patent application Ser. No. 09/104,653 entitled "Vector Packing and Saturation Detection in the Vector Permute Unit (VPU)" and filed Jun. 5, 1998 and Ser. No. 09/149,466 entitled "Wide Shifting in the Vector Permute Unit (VPU)" and filed Sep. 8, 1998. The content of the above-referenced applications are incorporated herein by reference.

BACKGROUND OF THE INVENTION

1. Technical Field

The present invention relates in general to multimedia facilities within processors and in particular to facilities within processors executing permute or shift operations for multimedia applications. Still more particularly, the present invention relates to a fast shift decode mechanism for facilities within processors executing permute or shift operations for multimedia applications.

2. Description of the Related Art

Multimedia applications are increasing, leading to an increased demand for multimedia facilities within processors. Processors, such as the PowerPC™ processor available from IBM Corporation of Armonk, N.Y., are increasingly incorporating such multimedia facilities. In the case of the PowerPC™, the multimedia facility is the vector multimedia extensions (VMX) facility.

One of the sub-units of the VMX multimedia processor engine is the vector permute unit (VPU). This unit is responsible for performing byte reordering, packing, unpacking, byte shifting, etc. In particular, this unit is responsible for performing byte reordering for the VMX vperm (vector permute) instruction of the PowerPC™ architecture, which reorders bytes within a source operand VA or VB according to target designations within quadword operand VC.

At the core of the VPU is a 32:16 byte-wide crossbar which can place any of 32 source bytes into any of 16 target byte positions. The current implementation of the crossbar network is a set of 16 33:1 byte-wide passgate multiplexers. Each 33:1 multiplexer is controlled by 32 selects which may select from any source byte of operands VA or VB to a common target byte and a "zero select" that is utilized to select zeros in the shift cases or in cases when the crossbar is not being utilized. FIG. 3 depicts a simple diagram of the crossbar. The flow for target byte 0 of the crossbar output is shown, and includes a 33:1 multiplexer capable of passing any byte of operands VA or VB to target byte 0 of the crossbar output. Multiplexer selects vpca_sel_0_0 through vpca_sel_31_0 are employed to select a byte from input operand VA or input operand VB to be passed to crossbar output xbar_out_0. The mechanism shown for target byte 0 is replicated for target bytes 1 through 15.

The selects for each multiplexer for each respective target byte are of the form vperm_sel_X_Y, where X is the source byte and Y is the target byte. The decoding required for generating the required crossbar selects is illustrated in FIG. 4. For the VMX vperm instruction, 32 selects for each target byte are generated by decoding the lower 5 bit of the respective byte in the operand VC register. That is, for target byte 0, the crossbar selects are generated by a 5-to-32 bit decode of bits 5–8 in byte 0 of the operand VC. Similarly, the crossbar selects for target byte 1 are generated from a 5-to-32 decode of bits 5–8 of VC byte 1, etc.

The vperm_sel_X_Y lines will then need to be qualified (vperm_qual) by verifying that the current instruction being executed is indeed a vperm instruction. This qualification requirement creates a critical timing path problem since the vperm_qual signal will have a minimum fanout of 512 (thirty-two selects per target byte with sixteen target bytes). The critical path through the VPU is from the decode of instruction operands, through the crossbar select generation, to the output of the crossbar. The required 512 fanout for the qualification signal vperm_qual may introduce unacceptable latency within this critical path, and may increase the execution time for a vperm instruction beyond 1 processor cycle.

The crossbar within the VPU is also utilized for the VMX vslo (vector shift left by octet) and vsro (vector shift right by octet) instructions of the PowerPC™ architecture. These instructions shift the bytes of operand VA left or right by a number of bytes indicated within bits 121–124 of operand VB. Because the crossbar is employed to perform the shifting, the crossbar selects which are asserted as a result of decoding the vslo and vsro shift amounts must be similarly qualified with verification that the instruction being executed is, in fact, a vslo or vsro instruction.

It would be desirable, therefore, to provide mechanism for eliminating or reducing the qualification requirement for crossbar selects employed when performing the vperm, vslo, vsro, or equivalent instruction. It would further be advantageous if the mechanism permitted a one-cycle latency for execution of instructions employing the crossbar within the VPU.

SUMMARY OF THE INVENTION

It is therefore one object of the present invention to provide an improved multimedia facility within processors.

It is another object of the present invention to provide an improved facility within processors executing permute or shift operations for multimedia applications.

It is yet another object of the present invention to provide a fast shift decode mechanism for facilities within processors executing permute or shift operations for multimedia applications.

The foregoing objects are achieved as is now described. A multimedia facility within a processor employs a crossbar to perform operations requiring byte reordering. Prior to the cycle in which an instruction is executed, the instruction is checked to determine if the instruction is a predetermined type of instruction. If not, the operand which should contain encoded crossbar selects is filled with zeros before presentation to the crossbar select generation logic. If the instruction is one of the predetermined type of instructions, however, the real operand containing the encoded crossbar selects is presented to the crossbar select generation logic. As a result, only crossbar selects which designate byte 0 of the source operand as the source need to be qualified with a signal verifying the instruction being executed. The fanout of the qualification signal is thus reduced to an acceptable level, at which 1 cycle latency and 1 cycle throughput may be achieved.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
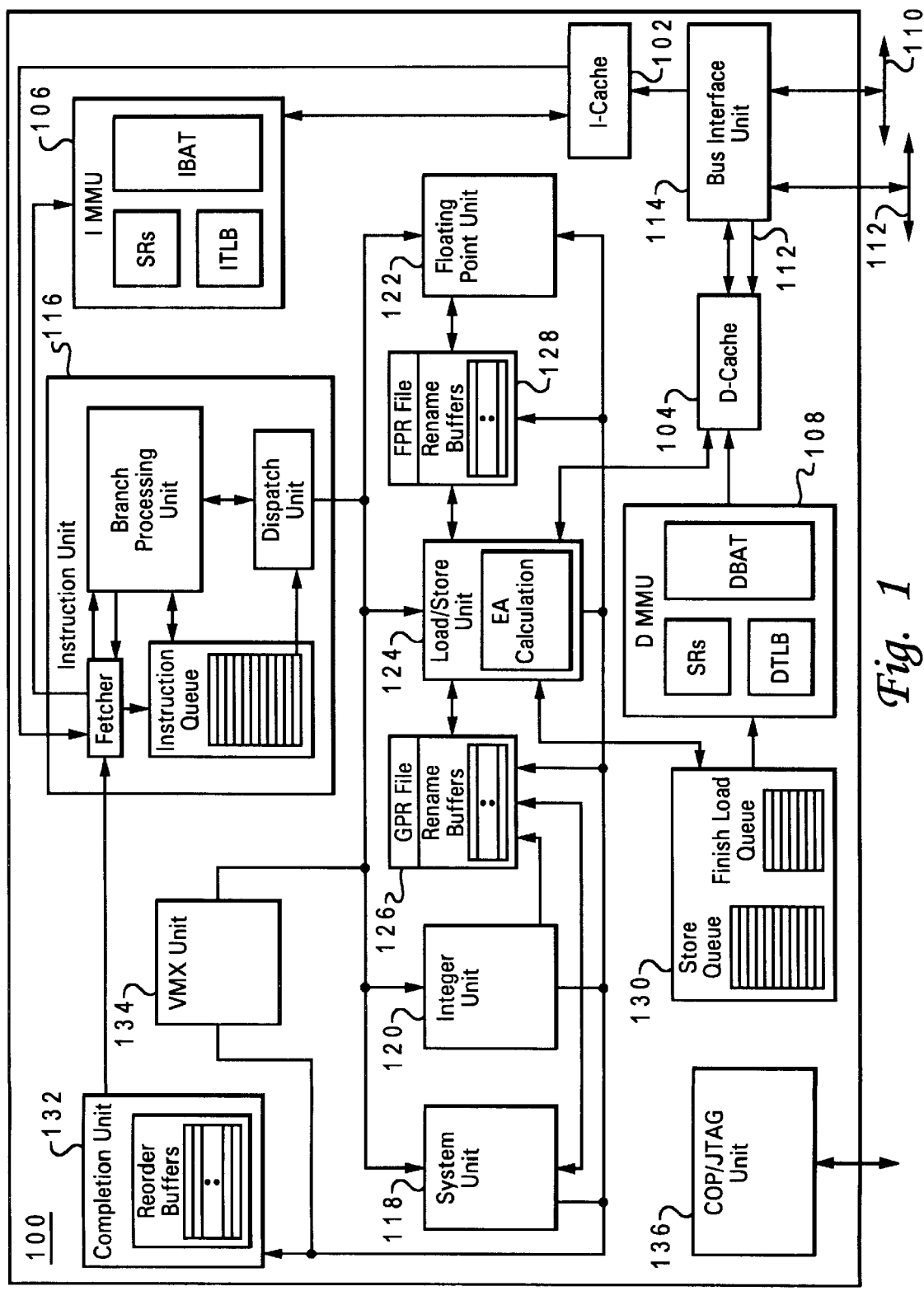
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit superscalar microprocessor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and a dispatch unit.

The dispatch unit within instruction unit 116 dispatches instructions as appropriate to executions units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128. VMX unit 134 performs byte reordering, packing, unpacking, and shifting, vector add, multiply, average, and compare, and other operations commonly required for multimedia applications.

Load/store unit 124 loads instruction operands from data cache 104 into integer or floating point registers 126 or 128 as needed, and stores instructions results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 136 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2A:
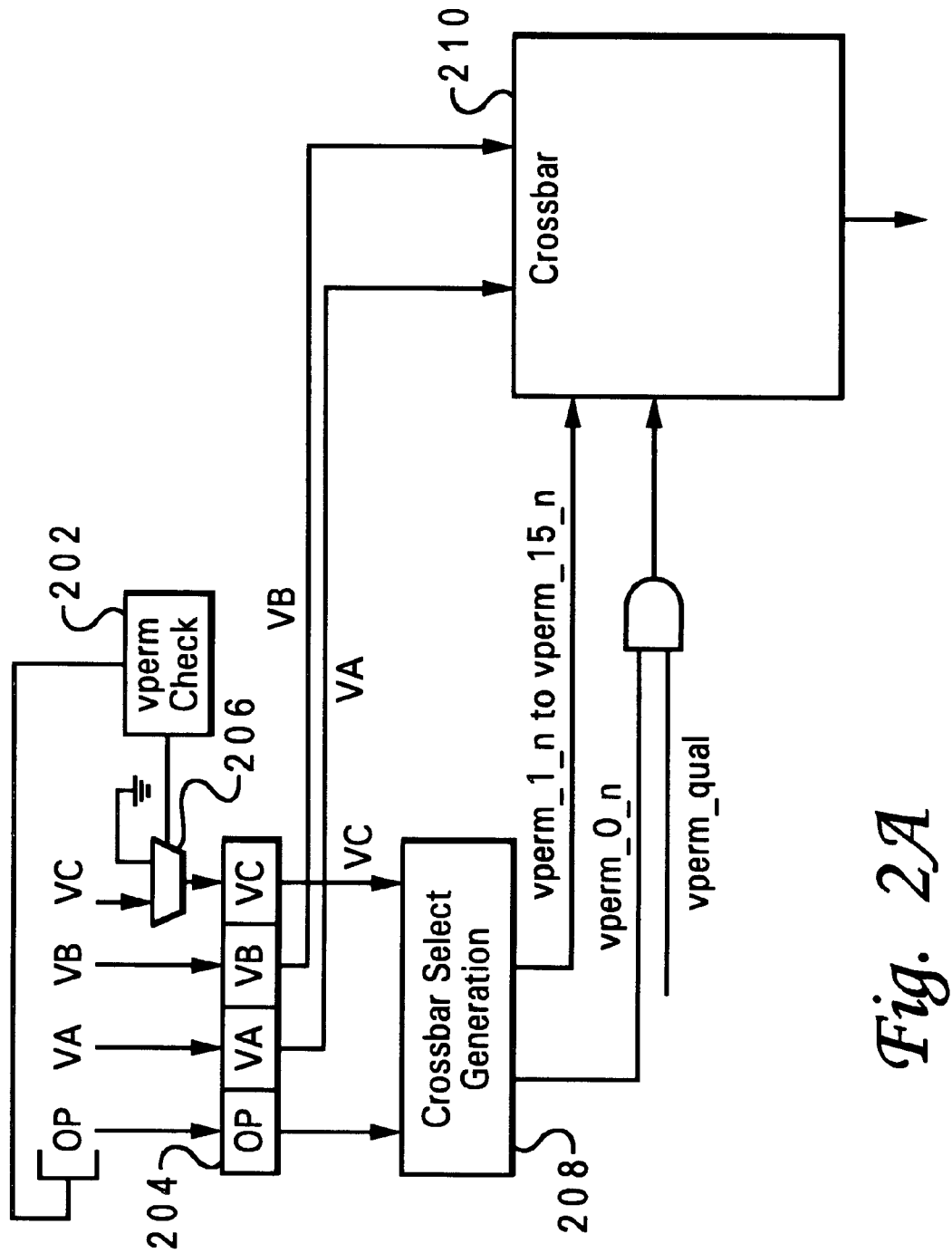
FIGS. 2A–2B are diagrams for a mechanism for avoiding qualification of all crossbar selects in accordance with a preferred embodiment of the present invention.
Figure 2B:
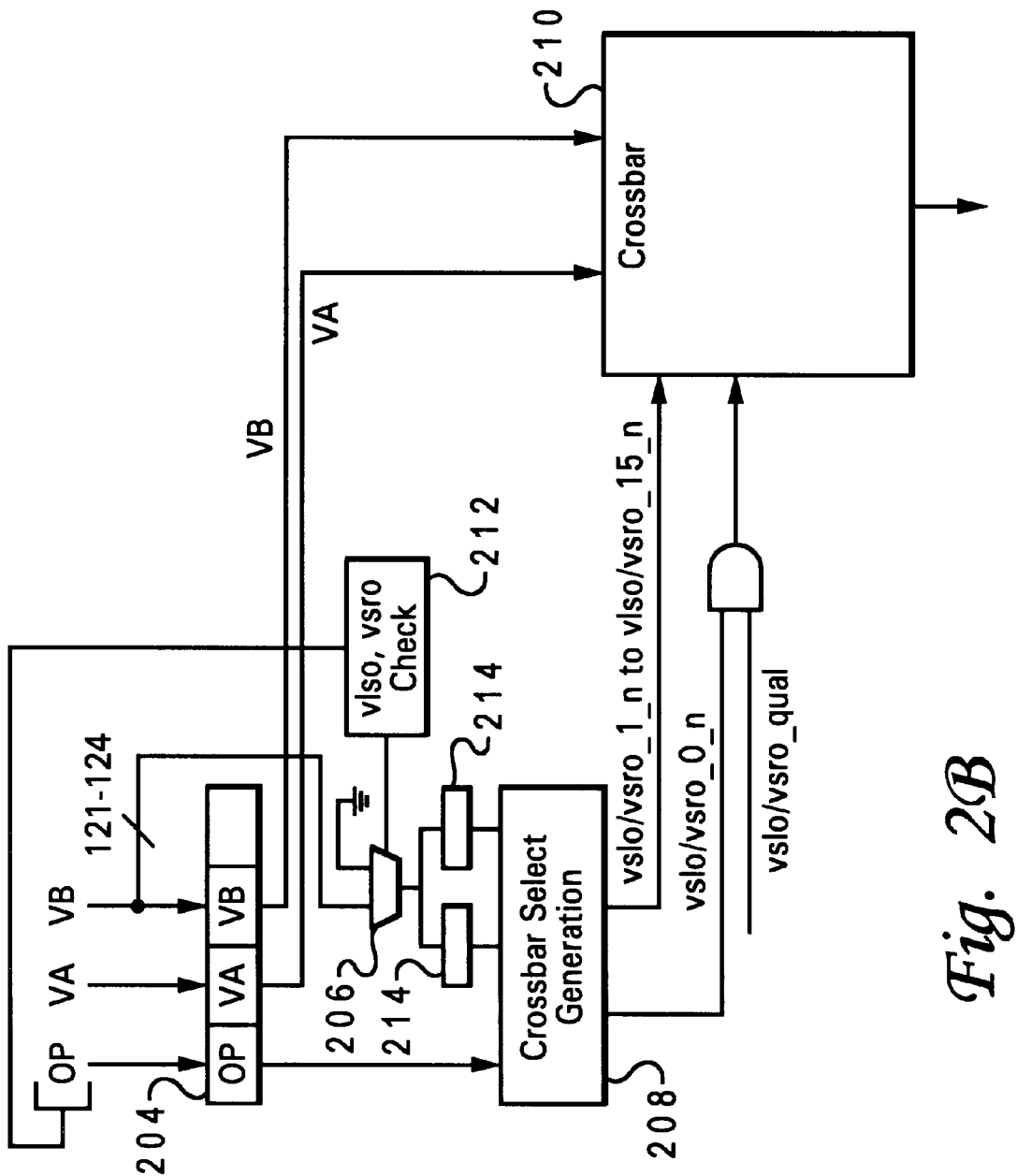

Referring now to FIGS. 2A–2B, diagrams of a mechanism for avoiding qualification of all crossbar selects in accordance with a preferred embodiment of the present invention is illustrated. The embodiment shown in FIG. 2A relates to an implementation for executing the vperm instruction of the PowerPC™ architecture, although a similar mechanism may be employed for other PowerPC™ instructions employing the crossbar or for instructions supported by other architectures which are equivalent to the vperm instruction or which otherwise require qualification of a large number of selects.

In order to avoid qualifying all crossbar selects with vperm_qual, a vperm check circuit 202 is employed which detects vperm instructions in the cycle prior to execution of the vperm instruction. This may be performed, for example, as the opcode and operands for an instruction are received at registers 204 within the VMX vector permute unit for execution during the next processor cycle. If the instruction is not a vperm instruction, the portion of registers 204 containing the operand VC is filled with zeros. If the instruction is indeed a vperm instruction, the correct operand VC is entered into the register. This may be accomplished, for example, by a multiplexer 206 selecting from the received operand VC and all zeros based on the output of vperm check logic 202. When the instruction to be executed is not a vperm instruction, zeroes may be substituted for operand VC in the vector permute unit since the VPU has its own copy of operand VC and no other instruction executed by the VPU employs operand VC. The VMX architecture of the exemplary embodiment contemplates other units, such as a vector simple unit. However, if the vperm instruction is executed within a unit executing other instructions which also employ operand VC, shadow registers may be employed as described below.

Figure 3:
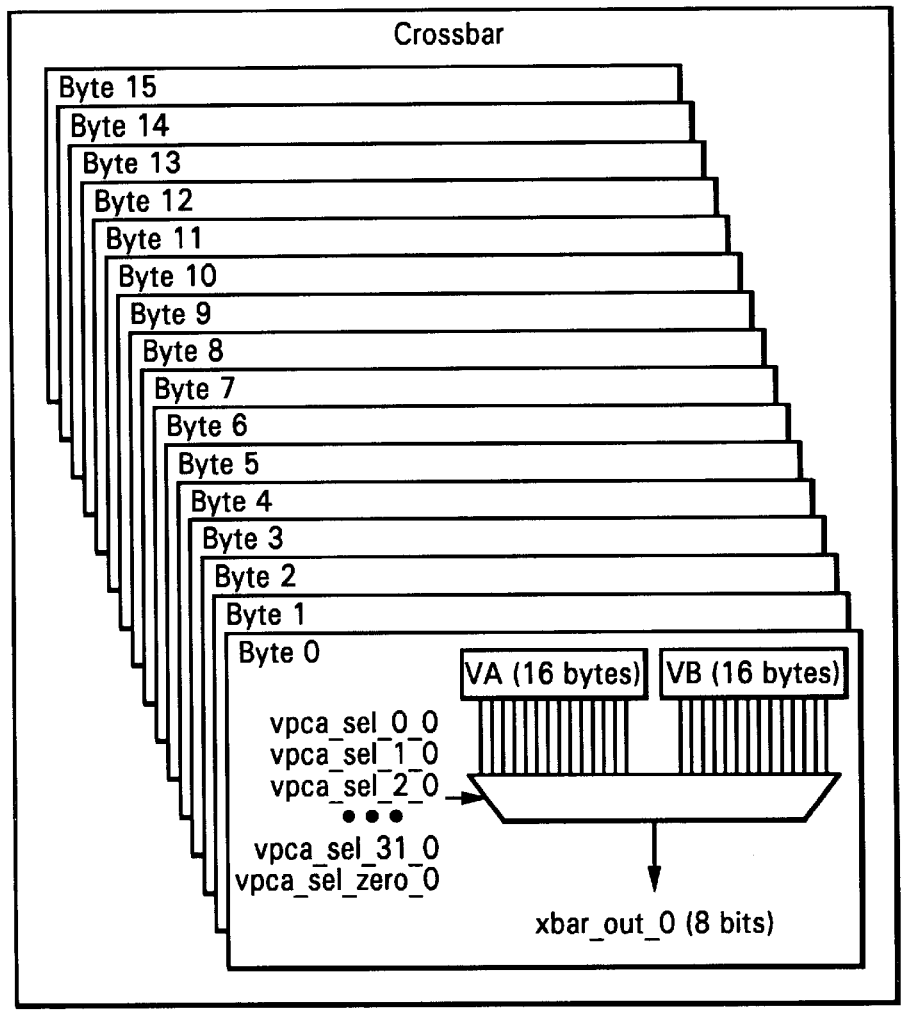
FIG. 3 depicts a simple diagram of the crossbar implemented within the vector permute unit.
Figure 4:
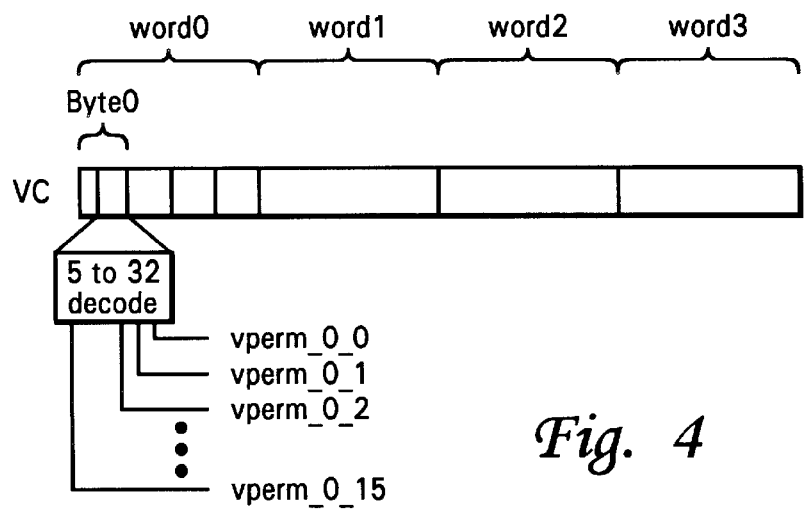
FIG. 4 is a diagram of the decoding required for generating crossbar selects in executing a vperm instruction.

The contents of operand VC are employed by crossbar select generation logic 208 to generate the required crossbar selects. As shown, crossbar selects vperm_sel_0_n are qualified by the signal vperm_qual, while no qualification is employed for selects vperm_sel_1_n through vperm_sel_15_n. All of these selects, qualified or not, are employed by crossbar 210, which is implemented as depicted in FIG. 3, to reorder the bytes of an operand VA or VB into the target bytes of the crossbar output.

Since the operand designating the target bytes for a vector permute is filled with zeros when an instruction being executed is not a vperm instruction, only crossbar selects in the form vperm_sel_0_n, where n is between 1 and 15, need to be qualified with vperm_qual. No other instruction executed by the VPU employs operand VC. If the instruction being executed is not a vperm instruction, the register containing operand VC within the VPU is not checked, and either crossbar selects are generated by logic for another instruction or the crossbar zero selects are asserted. If the instruction is a vperm instruction, the VPU register containing operand VC is checked and contains either the real VC or zeros as described above. Thus, only selects designating byte 0 of operands VA or VB (vperm_sel_0_n) need be qualified. This reduces the required fanout of the qualification signal vperm_qual from 512 down to an acceptable 16.

A similar implementation may be employed for avoiding qualification of all selects for the vslo and vsro instructions. However, since the real VB is utilized for many operations, 4 bit wide shadow registers should be employed. FIG. 2B is a diagram of a mechanism which may be employed where the operand containing the shift amount is also employed by other instructions executed within the same unit. In the exemplary embodiment, shadow registers 214 (one for vslo and one for vsro) are either passed bits 121–124 of operand VB or filled with zeros by vslo, vsro check logic 212, depending on the instruction being executed. Crossbar select generation logic 208 then utilizes the contents of shadow registers 214 in generating crossbar selects. Therefore, only crossbar selects which designate source byte 0 for the instruction need be qualified.

The present invention reduces the fanout required for a crossbar select qualification signal by employing a real operand containing encoded crossbar selects when the instruction being executed is an appropriate instruction, and otherwise utilizing an operand filled with zeros. Only crossbar selects which designate byte 0 as a source byte need to be qualified. Thus, with minimal additional hardware, the fanout of the qualification is reduced such that 1 cycle latency and 1 cycle throughput may be achieved for instructions utilizing the crossbar to reorder or shift bytes. The mechanism of the present invention may be employed for any instruction under any processor architecture which employs a crossbar requiring large numbers of selects to be qualified.

While the invention has been particularly shown and described with reference to a preferred embodiment, it will be understood by those skilled in the art that various changes in form and detail may be made therein without departing from the spirit and scope of the invention.

What is claimed is:

1. A method of qualifying crossbar selects, comprising:
   prior to execution of an instruction, determining whether the instruction is an instruction of a first type;
   during execution of the instruction:
      responsive to determining that the instruction is an instruction of the first type, passing an operand segment containing encoded crossbar selects to a select generation logic for the crossbar;
      responsive to determining that the instruction is not an instruction of the first type, passing an operand segment containing encoding for a defined subset of crossbar selects to the select generation logic; and
      qualifying the subset of crossbar selects with a signal verifying that the instruction being executed is an instruction of the first type.

2. The method of claim 1, wherein the step of passing an operand segment containing encoding for a defined subset of crossbar selects to the select generation logic further comprises:
   passing an operand segment filled with zeros to the select generation logic.

3. The method of claim 1, wherein the step of qualifying the subset of crossbar selects with a signal verifying that the instruction being executed is an instruction of the first type further comprises:
   qualifying crossbar selects designating byte 0 of an operand as a source with the signal.

4. The method of claim 1, wherein the step of determining whether the instruction is an instruction of the first type occurs one cycle prior to execution of the instruction.

5. The method of claim 1, wherein the step of passing an operand segment containing encoded crossbar selects to select generation logic for the crossbar further comprises:
   passing operand VC to the select generation logic.

6. The method of claim 1, wherein the step of passing an operand segment containing encoding for a defined subset of crossbar selects to the select generation logic further comprises:
   passing a quadword filled with zeros to the select generation logic.

7. The method of claim 1, wherein the step of passing an operand segment containing encoding for a defined subset of crossbar selects to the select generation logic further comprises:
   filling a register containing operand VC with zeros; and
   passing the contents of the register to the select generation logic.

8. The method of claim 1, further comprising:
   employing a shadow register to hold an operand segment utilized by the select generation logic to decode the crossbar selects;
   filling the shadow register with zeros if the instruction is not an instruction of the first type; and
   placing the operand segment containing encoded crossbar selects in the shadow register if the instruction is an instruction of the first type.

9. The method of claim 8, wherein the step of placing the operand segment containing encoded crossbar selects in the shadow register if the instruction is an instruction of the first type further comprises:
   placing bits 121–124 of operand VB in the shadow register.

10. A mechanism for of qualifying crossbar selects, comprising:
    means for determining, prior to execution of an instruction, whether the instruction is an instruction of a first type;
    means operative during execution of the instruction:
       for passing an operand segment containing encoded crossbar selects to select generation logic for the crossbar in response determining that the instruction is an instruction of the first type;
       for passing an operand segment containing encoding for a defined subset of crossbar selects to the select generation logic in response to determining that the instruction is not an instruction of the first type; and
       for qualifying the defined subset of crossbar selects with a signal verifying that the instruction being executed is an instruction of the first type.

11. The mechanism of claim 10, wherein the means for passing an operand segment containing encoding for a defined subset of crossbar selects to the select generation logic in response to determining that the instruction is not an instruction of the first type further comprises:
    means for passing an operand segment filled with zeros to the select generation logic.

12. The mechanism of claim 10, wherein the means for qualifying the subset of crossbar selects with a signal verifying that the instruction being executed is an instruction of the first type further comprises:

qualifying crossbar selects designating byte 0 of an operand as a source with the signal.

13. The mechanism of claim 10, wherein the means for determining whether the instruction is an instruction of the first type completes the determination one cycle prior to execution of the instruction.

14. The mechanism of claim 10, wherein the means for passing an operand segment encoding a subset of crossbar selects to select generation logic for the crossbar further comprises:

means for passing operand VC to the select generation logic.

15. The mechanism of claim 10, wherein the means for passing an operand segment encoding a subset of crossbar selects to the select generation logic further comprises:

means for passing a quadword filled with zeros to the select generation logic.

16. The mechanism of claim 10, wherein the means for passing an operand segment encoding a defined subset of crossbar selects to the select generation logic further comprises:

means for filling a register containing operand VC with zeros; and means for passing the contents of the register to the select generation logic.

17. The mechanism of claim 10, further comprising:

a shadow register holding an operand segment employed by the select generation logic to decode the crossbar selects;

means for filling the shadow register with zeros if the instruction is not an instruction of the first type; and means for placing the operand segment containing encoded crossbar selects in the shadow register if the instruction is an instruction of the first type.

18. The mechanism of claim 17, wherein the means for placing the operand segment containing encoded crossbar selects in the shadow register if the instruction is an instruction of the first type further comprises:

means for placing bits 121–124 of operand VB in the shadow register.

19. A circuit for performing byte reordering and shifting, comprising:

a crossbar containing n multiplexers, each multiplexer capable of placing any source byte of an operand into an nth target byte of a crossbar output in response to assertion of crossbar selects;

select generation logic decoding an operand segment to generate crossbar selects for the crossbar; and instruction checking logic checking an instruction prior to execution and:

responsive to determining that the instruction is a vector permute instruction, passing an operand segment containing encoded crossbar selects to the select generation logic; and responsive to determining that the instruction is not a vector permute instruction, passing an operand segment filled with zeros to the select generation logic.

20. The circuit of claim 19, further comprising:

a qualification signal verifying that the instruction being executed is a vector permute instruction and qualifying crossbar selects designating byte 0 of an operand as a source.

21. The circuit of claim 19, wherein the qualification signal qualifies one crossbar select for each target by of the crossbar output.

22. The circuit of claim 19, wherein the instruction checking logic fills an operand register with zeros in response to determining that the instruction is not a vector permute instruction.

23. The circuit of claim 19, further comprising:

a shadow register containing the operand segment employed by the select generation logic to generate crossbar selects for the crossbar.

24. The circuit of claim 23, wherein the shadow register contains zeros if the instruction is not a vector permute instruction and contains bits 121–124 of an operand if the instruction is a vector permute instruction.

* * * * *